S. J. HUDSON.
COSMETIC BOOKLET.
APPLICATION FILED FEB. 6, 1911.

990,270.

Patented Apr. 25, 1911.

Witnesses:

Inventress
Sarah Jane Hudson
By her Attorneys

UNITED STATES PATENT OFFICE.

SARAH JANE HUDSON, OF LONDON, ENGLAND, ASSIGNOR TO MÜLHENS & KROPFF, OF NEW YORK, N. Y.

COSMETIC-BOOKLET.

990,270.

Specification of Letters Patent. Patented Apr. 25, 1911.

Application filed February 6, 1911. Serial No. 606,744.

*To all whom it may concern:*

Be it known that I, SARAH JANE HUDSON, a citizen of Great Britain, residing at London, England, have invented a new and Improved Cosmetic-Booklet, of which the following is a specification.

This invention relates to a booklet carrying a cosmetic and permitting the same to be readily applied more particularly to the lips, so as to beautify the same.

Figure 1:
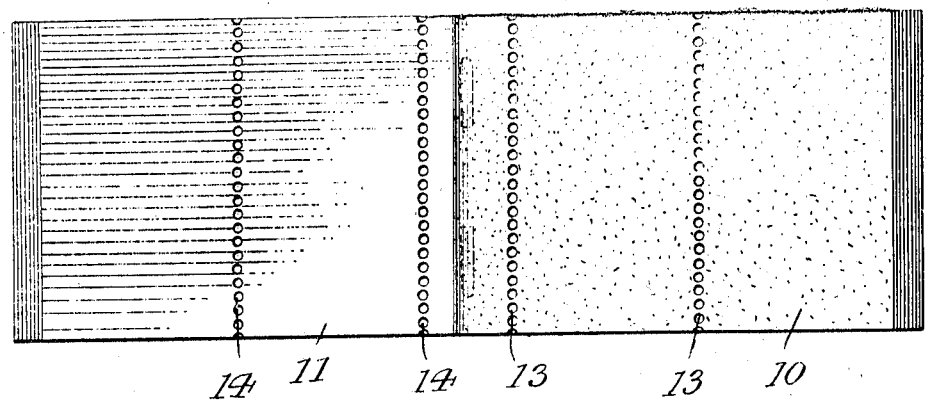
Figure 2:
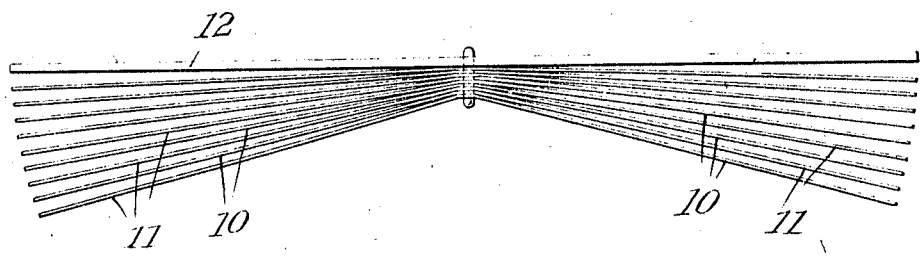
Figure 3:
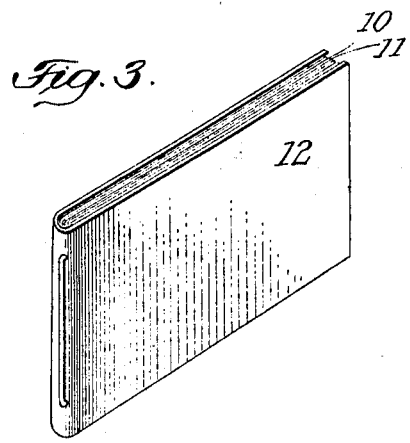

In the accompanying drawing: Figure 1 is a view of my improved cosmetic booklet, showing it open; Fig. 2 an end view thereof, and Fig. 3 a perspective view of the booklet showing it closed.

The booklet is composed of a series of parchment, paper, silk or cotton leaves 10, separated by interposed tissue leaves 11, both bound into a cover 12. Each leaf 10 is saturated with a liquid rouge solution of a harmless nature, which is adapted to be transferred to the lips by slightly moistening the leaf, and pressing it against the skin. In preparing the solution, 1 part of pulverized cochineal is dissolved in 10 parts of distilled water, and heated to the boiling point. To this solution is added a mixture consisting of 8 parts of cold distilled water and 2 parts of ammonia. The resultant mixture is allowed to stand for several days, more water is added, and the mixture is then boiled down and filtered. After the sheets have been saturated with the solution, they are dried and pressed, after which they are ready to be bound.

The tissue leaves 11 are waxed and perfumed in suitable manner, their scent being thus transferred within the booklet to the impregnated leaves 10, in a subtile manner.

Leaves 10, 11 are provided with alined upright rows of perforations 13, 14, two of such rows being preferably formed in each leaf. In this way the user can readily tear off one half of an impregnated leaf at a time, which suffices for a single application. Together with the severed portion of leaf 10, a corresponding portion of the tissue leaf is also torn from the book, which protects the fingers against contact with the color during manipulation.

My improved cosmetic booklet forms a desirable addition to a lady's toilet requisites, may be readily carried about, and permits an unostentatious application of the coloring composition.

I claim:

1. A cosmetic booklet comprising a plurality of leaves saturated with a rouge composition, and a plurality of interposed waxed leaves, said waxed leaves being perfumed to transmit their scent to the saturated leaves.

2. A cosmetic booklet comprising a plurality of leaves saturated with a rouge composition, and a plurality of interposed waxed leaves, said saturated and waxed leaves being provided with alined rows of perforations, whereby said leaves may be torn off in unison.

SARAH JANE HUDSON.

Witnesses:
B. WESTACOTT,
O. HOLUNLETE.